(12) United States Patent
Iyer et al.

(10) Patent No.: US 10,623,181 B2
(45) Date of Patent: Apr. 14, 2020

(54) SECURITY SYSTEM UTILIZING VAULTLESS TOKENIZATION AND ENCRYPTION

(71) Applicant: BANK OF AMERICA CORPORATION, Charlotte, NC (US)

(72) Inventors: Shankar R. Iyer, East Windsor, NJ (US); Maria Dominique, Kendall Park, NJ (US); Navanith Keerthi, Lawrenceville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 207 days.

(21) Appl. No.: 15/860,389

(22) Filed: Jan. 2, 2018

(65) Prior Publication Data

US 2019/0207754 A1    Jul. 4, 2019

(51) Int. Cl.
*H04L 9/08* (2006.01)

(52) U.S. Cl.
CPC ............ *H04L 9/085* (2013.01); *H04L 9/0869* (2013.01); *H04L 9/0877* (2013.01); *H04L 9/0894* (2013.01)

(58) Field of Classification Search
CPC .............................. H04L 9/085; H04L 9/0869
See application file for complete search history.

(56) References Cited

U.S. PATENT DOCUMENTS

| | | | |
|---|---|---|---|
| 6,118,874 A | 9/2000 | Okamoto et al. | |
| 6,125,185 A | 9/2000 | Boesch | |
| 7,167,565 B2 | 1/2007 | Rajasekaran | |
| 7,386,131 B2 | 6/2008 | Jing et al. | |
| 7,391,865 B2 * | 6/2008 | Orsini | G06F 21/31 380/201 |
| 7,688,975 B2 | 3/2010 | Lin et al. | |
| 8,077,863 B2 | 12/2011 | Hosaka et al. | |
| 8,085,938 B2 | 12/2011 | Kagaya et al. | |
| 8,243,933 B2 | 8/2012 | Schneider | |
| 8,266,438 B2 | 9/2012 | Orsini et al. | |
| 8,490,164 B2 | 7/2013 | Takahashi et al. | |
| 8,533,489 B2 | 9/2013 | Roeder et al. | |
| 8,654,971 B2 | 2/2014 | Orsini et al. | |
| 8,713,329 B2 | 4/2014 | Schneider | |
| 8,898,453 B2 | 11/2014 | Preiss et al. | |
| 8,989,390 B2 | 3/2015 | Gantman et al. | |
| 9,021,259 B2 | 4/2015 | Furukawa | |

(Continued)

*Primary Examiner* — Joseph P Hirl
*Assistant Examiner* — Stephen T Gundry
(74) *Attorney, Agent, or Firm* — Michael A. Springs; Moore & Van Allen PLLC; Nicholas C. Russell

(57) ABSTRACT

The present invention includes securing data using vaultless tokenization and encryption. The present invention uses static random token tables in conjunction with encryption methods in order to tokenize sensitive data for the purposes of secure transfer and storage. The present invention is configured to identify data for secure storage, split the data into two or more data segments, access one or more static random token tables containing random tokens, retrieve two or more random tokens from the one or more static random tables for each of the two or more data segments, combine the two or more random tokens into a tokenized sequence, and return the tokenized sequence. Moreover, additional encryption may occur before or after the data is split and/or before or after combining the random tokens into a tokenized sequence.

20 Claims, 6 Drawing Sheets

(56) References Cited

U.S. PATENT DOCUMENTS

| | | |
|---|---|---|
| 9,106,407 B2 | 8/2015 | Kipnis et al. |
| 9,430,655 B1* | 8/2016 | Stockton ............... G06F 21/602 |
| 9,652,511 B2 | 5/2017 | Litherland et al. |
| 9,704,159 B2 | 7/2017 | Pauker et al. |
| 9,882,790 B2 | 1/2018 | Ollikainen et al. |
| 10,356,088 B1* | 7/2019 | Peddada ............. H04L 63/0853 |
| 2007/0160198 A1* | 7/2007 | Orsini ..................... H04L 9/085 380/28 |
| 2008/0183992 A1* | 7/2008 | Martin ................ G06F 11/1469 711/162 |
| 2009/0097661 A1* | 4/2009 | Orsini ................... G06F 21/606 380/279 |
| 2010/0299313 A1* | 11/2010 | Orsini .................... H04L 9/085 707/652 |
| 2012/0072723 A1* | 3/2012 | Orsini ................ G06F 21/6209 713/165 |
| 2012/0166576 A1* | 6/2012 | Orsini ................ G06F 11/1471 709/217 |
| 2012/0166818 A1* | 6/2012 | Orsini .................... H04L 9/085 713/193 |
| 2012/0179916 A1* | 7/2012 | Staker ..................... G06F 21/53 713/189 |
| 2012/0198241 A1* | 8/2012 | O'Hare ................... G06F 21/32 713/189 |
| 2012/0331088 A1* | 12/2012 | O'Hare .............. G06F 21/6227 709/214 |
| 2013/0046995 A1* | 2/2013 | Movshovitz .......... H04L 9/0618 713/189 |
| 2014/0092890 A1 | 4/2014 | Lee et al. |
| 2014/0126718 A1* | 5/2014 | Movshovitz .......... H04L 9/0618 380/28 |
| 2014/0229731 A1* | 8/2014 | O'Hare ............... G06F 21/6218 713/165 |
| 2017/0201498 A1* | 7/2017 | Baig ................... G06F 21/6254 |
| 2018/0189502 A1* | 7/2018 | Kumar ................. G06F 21/602 |
| 2018/0357126 A1* | 12/2018 | Dhuse .................... G06F 3/067 |
| 2019/0108255 A1* | 4/2019 | Tabak .................. G06F 21/602 |
| 2019/0140832 A1* | 5/2019 | Leavy .................. H04L 9/3226 |
| 2019/0158288 A1* | 5/2019 | Williamson .......... H04L 9/3213 |
| 2019/0266147 A1* | 8/2019 | Beier .................... G06F 16/221 |
| 2019/0280860 A1* | 9/2019 | Peddada .............. H04L 9/0825 |

* cited by examiner

SECURITY SYSTEM UTILIZING VAULTLESS TOKENIZATION AND ENCRYPTION

FIELD

This invention relates generally to the field data security. In particular, embodiments of the invention relate to utilizing tokens and/or encryption to secure various forms of data.

BACKGROUND

Efforts have been made to secure data using tokenization. However, traditional forms of tokenization cause issues in securing the data and storing data over time. There exists a need to develop improved data security systems and processes.

BRIEF SUMMARY

Embodiments of the present invention address the above needs and/or achieve other advantages by providing apparatuses (e.g., a system, computer program product, and/or other device) and methods that allow for secure storage and transmission of data using vaultless tokenization and/or format preserving encryption. It should be understood that the present invention may be used with any type of data, such as but not limited to data for proprietary testing, confidential information, social security numbers, resource pool numbers, resource information, user identifiers and passwords, user names, or any other like data that has characters (e.g., number, letters, symbols, or the like). It should be understood that the present invention may utilize one or more random token tables that can be used to tokenize data. For example, the random token tables may comprise randomly generated token characters of the same length within each table, such as 1, 2, 3, 4, 5, 6, or other like character lengths. As such, one or more random token tables (and most likely multiple token tables) may be created having the same number of characters in each entry within a single table. These token tables may be stored using encryption so that only authorized users have access to them. Moreover, these random token tables can be static such that they do not have to change over time, and thus, the memory requirements for storing the token tables does not change over time. The random token tables may be utilized by splitting the data into data segments into two or more segments of random length; randomizing the data segments using the random token tables; and reassembling the random token segments into a tokenized sequence. In further embodiments, the data may not meet a threshold length to require splitting, and may be randomized using the random token table without splitting. In addition to the random token tables the data may also be encrypted before utilizing the random token tables (e.g., before or after splitting the data) and/or after using the random token tables (e.g., before or after use combining the random token segments). The encryption may be performed through the use of a symmetric encryption key, an asymmetric encryption key, hashing, and various cryptographic methods involving symmetric or asymmetric keys including, but not limited to, authentication keys, authorization keys, random number generation (RNG) keys, static key agreement keys, ephemeral key agreement keys, signature verification keys, key transport keys, key-wrapping keys, and master keys, or other types of encryption.

It should be understood that by utilizing the random token tables the present invention does not require storing all of the data, the encryption keys (e.g., which may change over time), and the tokenized values for each of the encryption keys used over time. Storing data in this way increases the memory requirements because as new data is added and/or as encryption keys change over time (e.g., as required by entities over time for security purposes), not only is the data, the encryption key, and the tokenized data stored, but also the second encryption key and the second tokenized data must also be stored in order to be able to identify how the data has been stored an used over time. Without storing the data, the encryption keys, and the tokenized data over time a user would not be able to link the data, the first tokenized data, the second tokenized data, the $n^{th}$ tokenized data, as the encryption keys change over time. This storage system requires exponentially expanding data and memory requirements to store the data and tokenized data over time. The present invention solves this issue by utilizing the static random token tables, which do not change over time, the encryption keys, and the original data. The system does not have to store the tokenized data as it changes over time, it only requires storing the encryption keys as they change over time. The encryption keys and the static random token tables may be used at any time to identify the original data and/or any tokenized data.

Embodiments of the invention relate to systems, methods, and computer program products for vaultless tokenization and encryption of data, the invention comprising accessing one or more random token tables containing random tokens, retrieving two or more random token segments that are mapped to the two or more data segments from the one or more random token tables for each of the two or more data segments, combining the two or more random token segments into a tokenized sequence, and returning the tokenized sequence.

In some embodiments, the invention is further configured encrypt the data into encrypted data and split the encrypted data into two or more encrypted data segments.

In some embodiments, encrypting the data comprises encrypting the data using format preserving encryption.

In some embodiments, the tokenized sequence is encrypted, and encrypting the tokenized sequence further comprises encrypting the tokenized sequence using format preserving encryption.

In some embodiments, accessing the one or more static random tables comprises decrypting the encrypted one or more static random token tables, storing the one or more static random token tables temporarily in the one or more memory components, and removing the one or more static random tables from temporary storage after retrieving the two or more random tokens.

In some embodiments, the random tokens of one or more static random token tables have lengths of one to six characters.

In some embodiments, the invention is further configured to determine when the data contains less than the threshold number of characters, access one or more random token tables containing random tokens, retrieve a single random token segment that is mapped to the data from the one or more random token tables, wherein the random token segment that is mapped to the data represents the tokenized sequence, return the tokenized sequence.

In some embodiments, the two or more data segments each comprise three to six characters.

In some embodiments, returning the tokenized sequence comprises storing the tokenized sequence for future use.

In some embodiments, the invention is further configured to receive a request from a user to access the data, authenticate the user for access to the data, identify access permission of the user, provide the encrypted tokenized sequence as input for detokenization, decrypt the encrypted tokenized sequence to determine the tokenized sequence, split the tokenized sequence into the two or more random token segments, access the one or more static random token tables, retrieve the two or more encrypted data segments from the one or more static random token tables for each of the two or more random token segments, combine the two or more encrypted data segments into the encrypted data, decrypt the encrypted data into the data, and provide the data to the user in full or in partial form based on the access permission of the user.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Having thus described embodiments of the invention in general terms, reference will now be made to the accompanying drawings.

Figure 1:
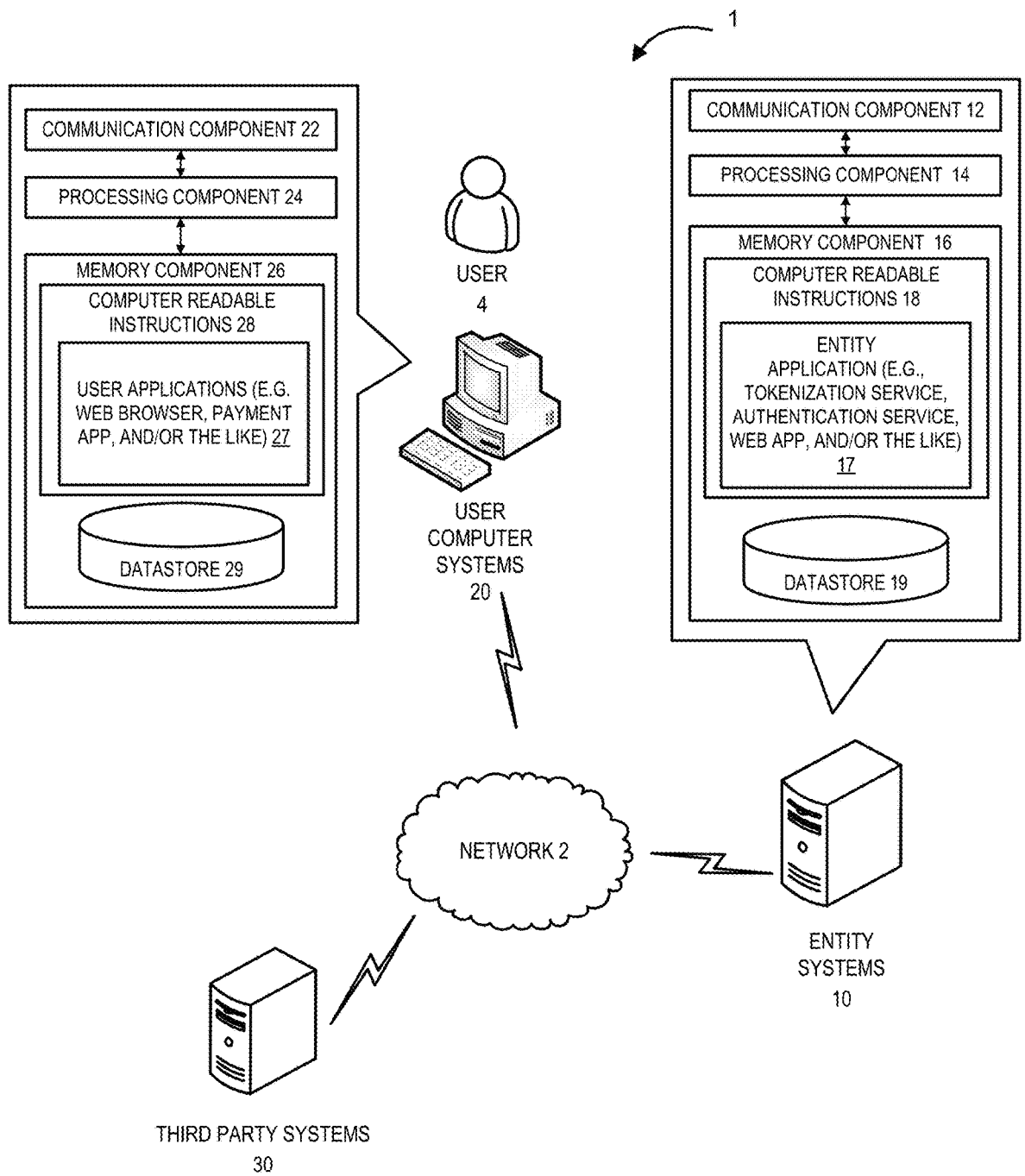

FIG. 1 illustrates a vaultless tokenization and encryption system environment, in accordance with embodiments of the present invention.

Figure 2:
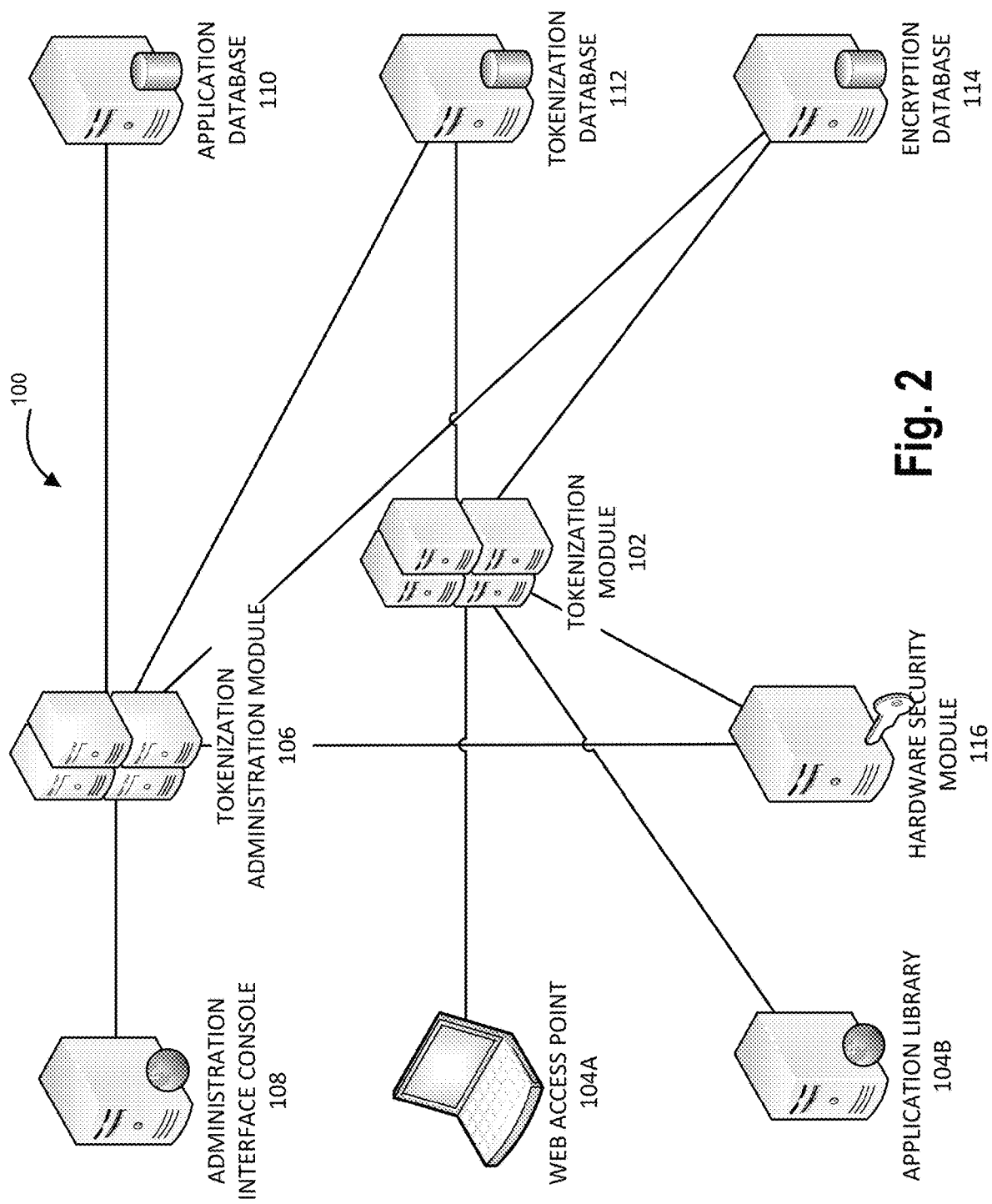

FIG. 2 illustrates a vaultless tokenization and encryption system diagram, in accordance with embodiments of the present invention.

Figure 3:
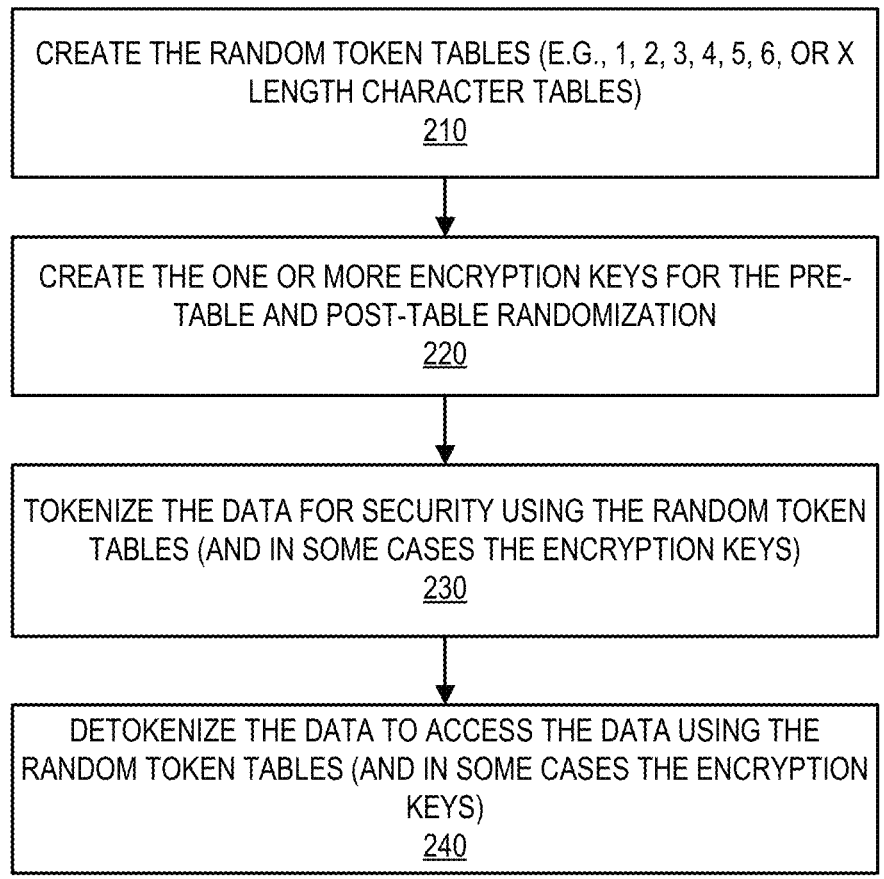

FIG. 3 illustrates a high level process flow for vaultless tokenization and encryption, in accordance with embodiments of the present invention.

Figure 4:
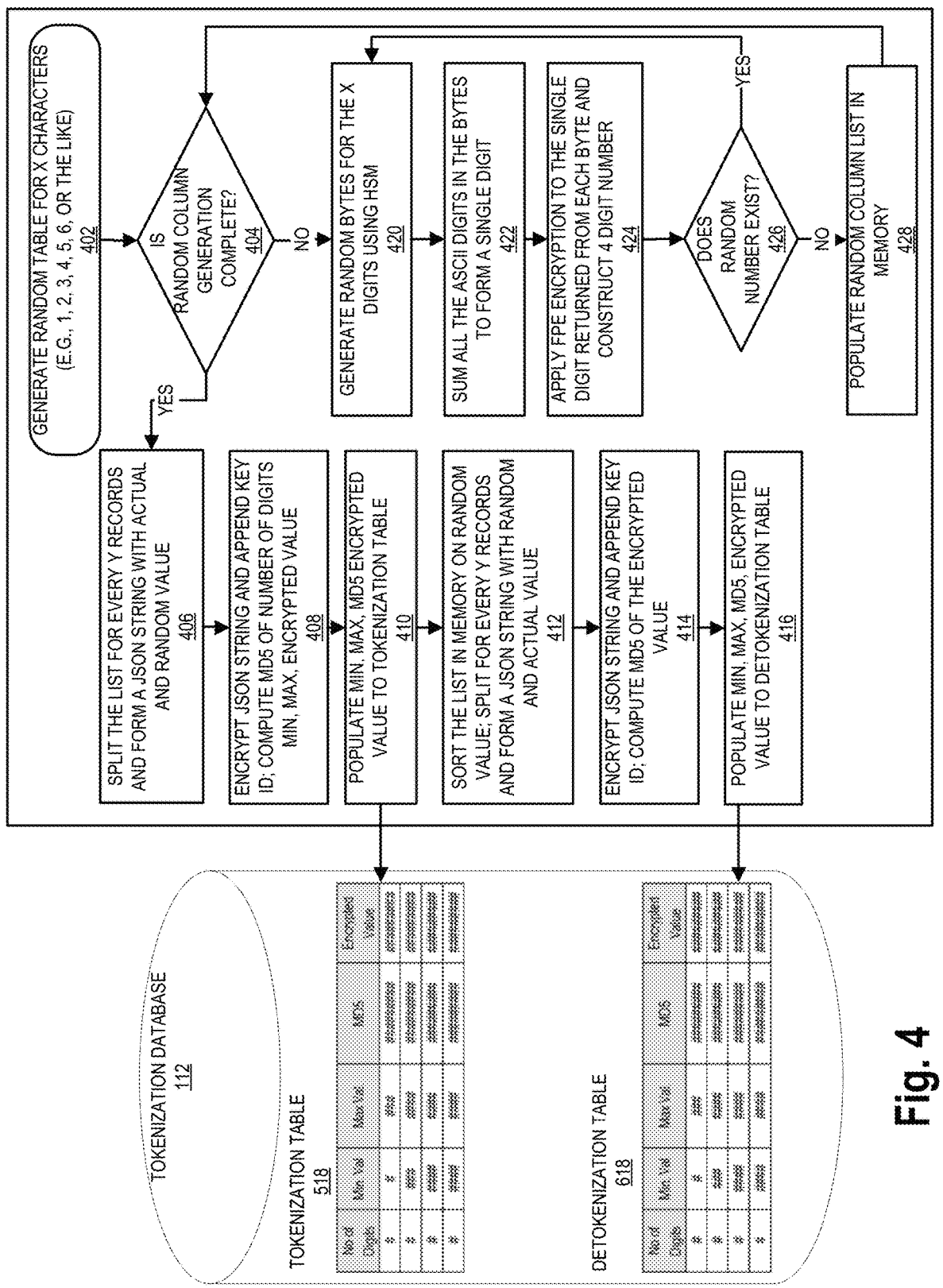

FIG. 4 illustrates a process flow for creating the random tokens for the vaultless tokenization database, in accordance with embodiments of the present invention.

Figure 5:
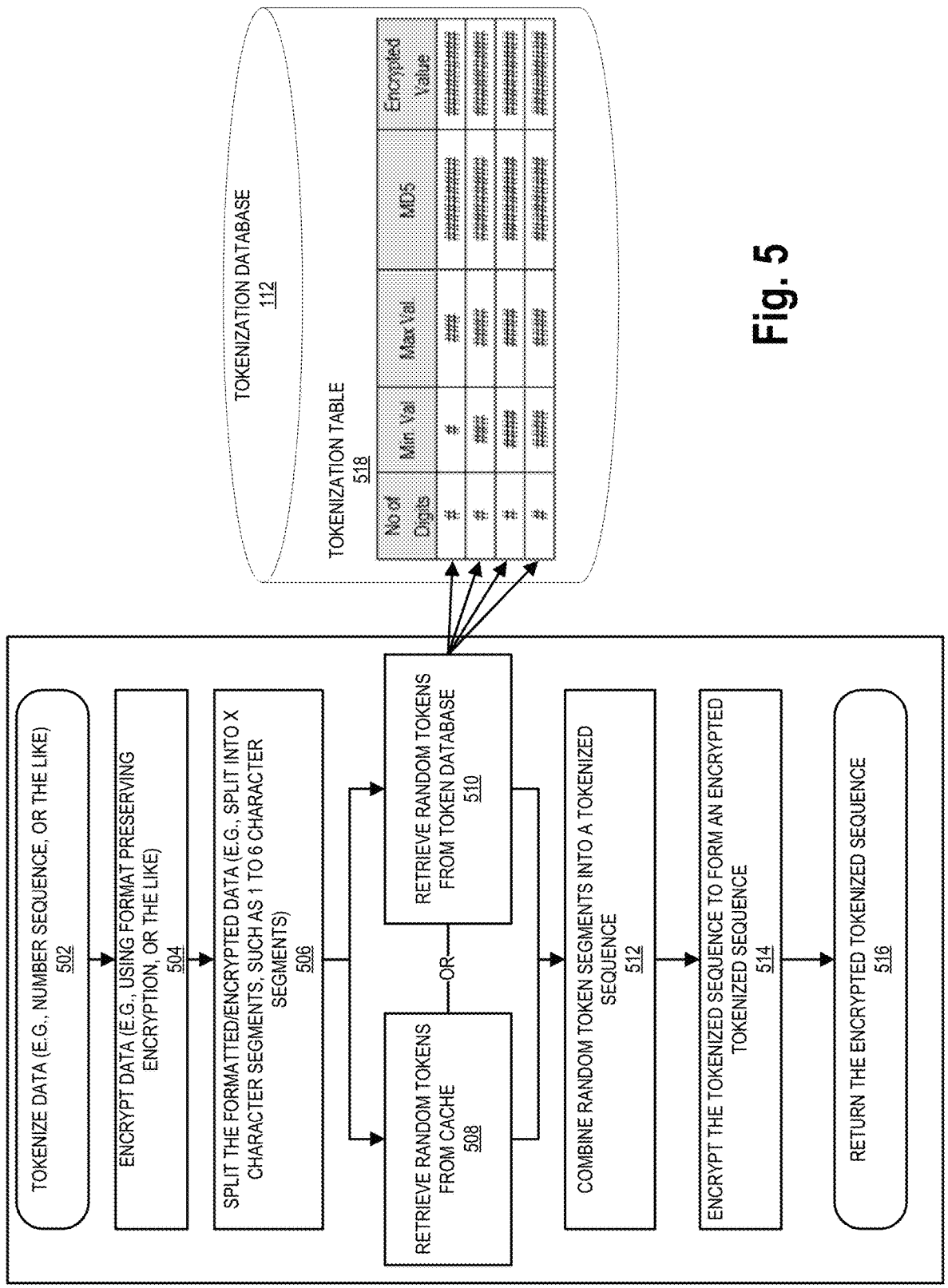

FIG. 5 illustrates a process flow for performing tokenization of the data using the vaultless tokenization and encryption system, in accordance with embodiments of the present invention.

Figure 6:
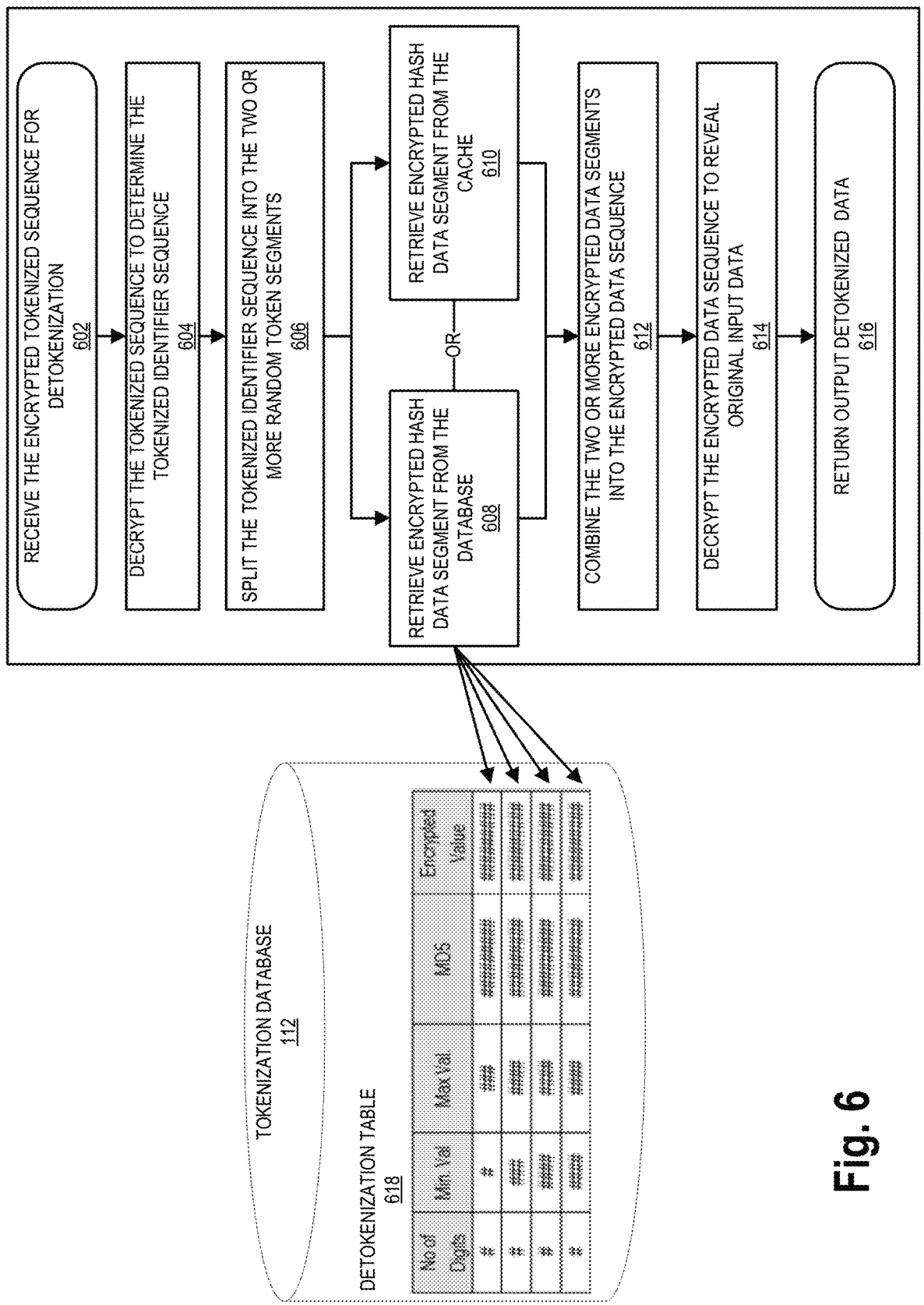

FIG. 6 illustrates a process flow for performing detokenization of the data using the vaultless tokenization and encryption system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Systems, methods, and computer program products are herein disclosed that provide for improving the security associated with storing data, reducing the memory required to store data over time, as well as allowing for customized secure storage based on requirements of the entity, or group therein, storing the data. The present invention utilizes static random token tables and various encryption keys that can be used as the entity desires in order to store any type of sensitive data. As such, as will be described herein, the storage of the data is more secure and uses less memory than traditional tokenization and encryption methods. The present invention solves at least the technical problem of storing data efficiently using reduced memory requirements.

FIG. 1 illustrates a vaultless tokenization and encryption system environment 1, in accordance with embodiments of the invention. As illustrated in FIG. 1, one or more entity systems 10 are operatively coupled, via a network 2, to one or more user computer systems 20, one or more third-party systems 30, and/or one or more other systems (not illustrated). In this way, the user 4 (e.g., one or more associates, employees, agents, contractors, sub-contractors, representatives, customers, or the like of the entity and/or the third-parties), through a user application 27 (e.g., web browser, dedicated or specialized application, or the like), may communicate with the entity application 17 (e.g., website, dedicated or specialized application, point of interaction, or the like) of the entity systems 10 and/or a third party application 37 (e.g., website, dedicated or specialized application, point of interaction, or the like) of the one or more third party systems 30. As will be described in further detail herein, the entity or third-party party (e.g., or a user 4 associated therewith) may securely store data utilizing the tokenization process and/or securely access the data utilizing a detokenization process.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, the one or more processing components 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more user computer systems 20, the one or more third-party systems 30, and/or the one or more other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more entity systems 10 comprise computer-readable instructions 18 stored in the one or more memory components 16, which in one embodiment includes the computer-readable instructions 18 of an entity application 17 (e.g., secure website application, secure dedicated application, or the like). In some embodiments, the one or more memory components 16 include one or more data stores 19 for storing data related to the one or more organization systems 10, including, but not limited to, data created, accessed, and/or used by the entity application 17. The entity application 17 may be representative of one or more applications that are specifically used to allow for the creation, use, and/or access of the tokenization and/or detokenization processes, which will be described in further detail herein.

As illustrated in FIG. 1, users 4 may access the entity application 17 (e.g., internal user) directly and/or through the third party application 37 (e.g., external third party user), through the one or more user computer systems 20. The one or more user computer systems 20 may be a desktop, mobile device (e.g., laptop, smartphone device, PDA, tablet, watch, wearable device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the one or more entity systems 10, the one or more third-party systems 30, and/or the one or more other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the one or more user computer systems 20 may have computer-readable instructions 28 stored in the one or more memory components 26, which in one embodiment includes the computer-readable instructions 28 for one or more user applications 27, such as dedicated applications (e.g., apps, applet, or the like), portions of dedicated applications, a web browser or other apps that allow the user 4 to take various actions, including allowing the user 4 to access applications located on other systems, or the like. In some embodiments, the user 4 utilizes the one or more user computer systems 20 to interact with the one or more entity systems 10 in order to tokenize and/or detokenize data, as will be discussed in further detail herein.

As illustrated in FIG. 1, one or more third-party systems 30 may communicate with the one or more entity systems 10 and/or the one or more user computer systems 20 in order to allow a user 4 to tokenize data for secure storage and/or in order to detokenize secure data. In some embodiments the third-party may be the party that is requesting the entity to securely store data on behalf of the third-party. Alternatively, in some embodiments the third-party may be accessing the secure data of the entity that the entity is securely storing on its own behalf. As such, the one or more third-party systems 30 are operatively coupled, via a network 2, to the one or more organization systems 10, the one or more user computer systems 20, and/or the one or more other systems. The one or more third-party systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, and/or the one or more other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memory components 36, which in one embodiment includes the computer-readable instructions 38 of one or more third party applications 37 that allow the user 4 to access the one or more entity systems 10 for securing data and/or accessing secure data using the tokenization and/or detokenization process through the one or more third-party systems 30 as will be described herein in further detail.

Moreover, one or more other systems may be operatively coupled to the one or more entity systems 10, the one or more user computer systems 20, and/or the one or more third-party systems 30, through the network 2. The one or more other systems have components the same as or similar to the components described with respect to the one or more entity systems 10, the one or more user computer systems 20, and/or the one or more third-party systems 30 (e.g., one or more communication components, one or more processing components, and one or more memory devices with computer-readable instructions of one or more applications, one or more datastores, or the like). Thus, the one or more other systems communicate with the one or more entity systems 10, the one or more user computer systems 20, the one or more third-party systems 30, and/or each other in same or similar way as previously described with respect to the one or more organization systems 10, the one or more user computer systems 20, and/or the one or more third-party systems 30.

FIG. 2 illustrates a vaultless tokenization and encryption system diagram, in accordance with embodiments of the present invention. It should be understood that the components described with respect to FIG. 2 may be operated by the entity, the third-party, or the like. As illustrated in the embodiment of FIG. 2, the system 100 includes a tokenization module 102 that is operatively coupled to various systems (e.g., databases, interfaces, applications or the like) across the system 100 including third party access systems (e.g., application library 104B, web access 104A), a token administration module 106, an administration interface console 108, an application database 110, a tokenization database 112, an encryption database 114, and/or a hardware security module (HSM) 116.

The tokenization module 102 provides tokenization services to users 4 (e.g., clients, customers, or the like) via the third party systems 104. As used herein, the term tokenization services may encompass all processes associated with tokenizing and detokenizing data (e.g., in single requests, using batch processing, or the like), which will be described in further detail with respect to FIGS. 3-6. All requests for tokenization and detokenization received from the third party access systems 104 are received by the tokenization module 102, which must authorize any requests received from the third-party systems 104. The tokenization module 102 permits communication with the other systems described in FIG. 2 (e.g., the one or more entity systems 10). As such, the tokenization module 102 provides a third-party facing application that provides cryptographic functions for allowing third-parties to tokenize and/or detokenize the data. As such, the tokenization module 102 includes authentication services that dictate access by users 4 and applications. To enhance security, in some embodiments, users 4 and applications must pass authentication information with every call to the tokenization module 102. Only after successful authentication will the tokenization module 102 perform the requested tokenization service.

As discussed above, in some embodiments, the tokenization module 102 provides tokenization services to third-party users 4 in two ways. As shown in FIG. 1, users can call the tokenization service through a web service 104a (e.g., REST service, or the like) or through the application library 104b developed as part of the present system. Each third party service (e.g., user, application, or the like) is registered with the system 100 in order to access the tokenization module 102. In some embodiments, third-party users access the tokenization service via a secure hypertext transfer protocol (HTTPS) uniform resource locator (URL) over transport layer security (TLS) protocol. Moreover, in some embodiments the third party applications must pass authentication information (e.g., user identification/secret or javascript object notation (JSON) web token (JWT), or the like) in order to access the tokenization module 102 and pass any requests to the other components of FIG. 2.

As further illustrated in FIG. 2, the system 100 also includes a tokenization administration module 106, which breaks the key operations and backend call functions into abstract commands (e.g., simplifies the commends to the modules, databases, or the like of the system 100). The tokenization administration module 106 may be accessed by entity users 4 through an administration interface 108. The entity users 4 may be authorized users that are able to access the components of FIG. 2 through the administration interface 108. The administration interface 108 may be a portal (e.g., web based user interface (UI) application, or the like) that allows the entity users 4 to access the tokenization and detokenization functions, manage the third party applications and token formats, or the like. The administration interface 108 may not interact with any backend components illustrated in FIG. 2, but instead may communicate with the rest of the system 100 through the tokenization administration module 106.

An authentication service may be utilized to authorize and/or determine the permission of the users 4 (e.g., third party users and/or the entity users). As such, every call to the tokenization module 102 is intercepted and the credentials are validated before actions are taken within the system 100. The authentication service may provide a central mechanism for managing authentication methods and expanding to other forms of authentication without otherwise impacting the tokenization system 100.

Furthermore, FIG. 2 illustrates that the system 100 includes an application database 110, tokenization database 112, and/or the encryption database 114. The application database 110 may be an SQL server database wherein information regarding registered applications are stored. The application database 110 may also contain the information required to perform authentication by the authentication service described above. In some embodiments only the tokenization module 102 and the authentication service may access the application database 110 for security purposes. The tokenization database 112 may also be a SQL server database designed to store information regarding the random token tables, tokenization formats, and format permissions. In some embodiments only the tokenization module 102 and the tokenization administration module 106 may access the tokenization database 112 for security purposes, and access may be granted via the authentication service. The encryption database 114 may also be a SQL server database which stores information about the encryption keys used in the tokenization and/or detokenization process. This database only stores encrypted keys and metadata associated with encrypted keys. In some embodiments, for security purposes only the tokenization module 102 and the tokenization administration module 106 may access the encryption database 114.

FIG. 2 also depicts a hardware security module (HSM) 116 designed to interact with the tokenization module 102 and tokenization administration module 108. In some embodiments, the HSM 116 may include a dedicated partition for the tokenization and encryption services, which will be described in further detail herein. In some embodiments, any system accessing the HSM 116 must be registered offline using mutual authentication, and this operation must be completed before accessing HSM at runtime. In some embodiments, the tokenization module 102 uses Public-Key Cryptographic Standards (PKCS #11), API standard and a cryptoki.dll library for accessing HSM at runtime. A sequential number of operations may be followed when performing any action with HSM, which in some embodiments may include initializing cryptoki.dll, opening a session, logging in to the specific partition related to encryption and tokenization, loading object data, performing encryption and tokenization services, closing the session, and finalizing the cryptoki.dll following the unloading of the application.

FIG. 3 illustrates a high level process flow for vaultless tokenization and encryption, in accordance with embodiments of the present invention. As shown in block 210, the system begins the vaultless tokenization and encryption process by creating the random token tables that are later used to map the segmented data portions. The random token tables may include a specific number of characters to map the data depending on how the data is segmented. For instance, in some embodiments a numerical data string might be segmented into 5-digit portions. In this embodiment, the random token table would include a column containing iterations of 5-digit numerical segments. It should be understood, as will be described in further detail later, that any number of random token tables may be created, and each table may have random characters of the same length (e.g., "X" number of characters, such as, 1, 2, 3, 4, 5, 6, or the like). The random token tables may be used by any entity and/or third-party in customizable ways to segment data in any way the entity, third-party, or sub-group thereof, which adds an additional layer of security to secure storage of the data. In some embodiments, the ideal number of characters in a split segment may be set to a specific number. For instance, the system may be configured to split the data in to segments containing an ideal number of 6 characters. For a numerical data string containing 14 digits, the system would split the data string into 3 data segments, the first containing 6 digits, the second containing 6 digits, and the third containing only 2 digits. In some embodiments, the original numerical data may have a length equal to the ideal number of characters and would not require splitting. For instance, the original data may be only 6 digits in length and would not require splitting. In other embodiments, splitting of the original data may not occur unless the original data meets a threshold character length, such as 6 characters or digits. By using a segment length of 6 digits, the system can achieve a threshold level of security wherein the odds of randomly guessing the mapped data portion for each 6 digit segment are one in a million.

In some embodiments, the original data may be a numerical sequence that includes a Luhn checksum digit. The Luhn algorithm or Luhn formula, also known as the "modulus 10" or "mod 10" algorithm, is a checksum formula used to validate a variety of identification numbers, such as credit card numbers or international mobile equipment identification (IMEI) numbers. While not intended to be a cryptographically secure hash function; it allows a system to easily and quickly distinguish valid numbers from mistyped or otherwise incorrect numbers by appending the Luhn checksum digit ("check digit") to the end of the number sequence. In instances where the original data contains a check digit, the system tokenizes the data using "n−1" digits, wherein "n" represents the number of digits in the original data, and the last digit is removed prior to tokenization to ensure that the tokenized sequence does not violate the Luhn checksum algorithm. The check digit may be appended back to the tokenized sequence (e.g., added based to the sequence after the n−1 data is tokenized) at the conclusion of the tokenization process or otherwise stored in the tokenization database. In some instances, metadata associated with the tokenized sequence may indicate the check digit itself, indicate that the original data contained a check digit, or instruct the system to remove the re-appended check digit prior to the detokenization process. Alternatively, in some embodiments the n−1 tokenized sequence may be used to create a new check digit for the sequence (e.g., add the n−1 tokenized sequence together and use the last digit of the added sequence as the check digit, or the like). In this way, even after the data is tokenized, it will include a check digit that verifies the type and/or accuracy of the tokenized sequence (e.g., still be identified as a credit card number, or the like).

Next, as illustrated in block 220 of FIG. 3, one or more encryption keys are created for pre-table and post-table randomization operations. In some embodiments, the encryption keys may be symmetric key and/or are format preserving encryption keys created using the hardware security module 116. However, it should be understood that any encryption methods may be utilized, such as the use of hashing, the use of asymmetric keys and the use of various symmetric or asymmetric cryptographic key forms including, but not limited to, authentication keys, authorization keys, random number generation (RNG) keys, static key agreement keys, ephemeral key agreement keys, signature verification keys, key transport keys, key-wrapping keys, and master keys.

Block 230 of FIG. 3 illustrates that the system tokenizes the data by splitting the data and retrieving random tokens from the one or more random token tables for each of the split data segments. Moreover, in some embodiments, the data may be encrypted before or after splitting the data, and/or before or after reorganizing the random tokens, as will be discuss in further detail herein. After tokenization, and potentially encryption, the tokenization module 102 can then return the tokenized sequence, such as to a database for storage and/or to a user 4.

Finally, as illustrated in block 240 of FIG. 3, when the data is needed, a user 4 (e.g., third party user, or internal entity user) may use the system to detokenize the tokenized data in order to access the original data. Detokenization is done using the random token tables created in block 210, and potentially the encryption keys created in block 220, in the reverse of the tokenization process, as will be described in further detail herein. It should be understood that the random token tables described herein may be a single set of one or more token tables that are used for both tokenization and detokenization, or alternatively, the random token tables may include a set of one or more token tables used for tokenization, and a separate set of one or more token tables used for detokenization.

FIG. 4 illustrates a detailed process flow for creating the random token tables, in accordance with embodiments of the present invention. Generation of the tokens for the random token table is done through a multi-step process. The process starts with block 402, which indicates that the random tokens are generated for the token table. The random tokens for each table have the same length (e.g., "X" number of characters, such as 1, 2, 3, 4, 5, 6, or the like). It should be understood that when the random token table reaches random tokens that have 6, 7, 8, or other like lengths the tables may become too large for storage and/or efficient retrieval, and as such the length of the tokens for each token table may be limited to 6 characters or less. In some embodiments, the length of the tokens for each token table may have at least 3 characters or more.

Block 404 of FIG. 4 illustrates that it is determined if the random generation is completed. With respect to numerical random token tables, if the random token generation is not complete, the system generates random bytes for the X digits using the HSM 116, as shown in block 420. Based on the length of the digits requested for the random token table, the HSM 116 generates corresponding random bytes. These bytes are split and the corresponding ASCII value of each byte is summed to form a single digit as shown in block 422. These single digits, when combined, form the token which will be of the same length as the digit requested. These tokens are unique and cannot be duplicated. The randomly generated unique tokens are then assigned to the digits, and along with the assigned digit form a random token for the token table, which can be used to tokenize data.

After the ASCII value of each byte is summed to form a single digit as shown in block 422, the digits are encrypted using the HSM 116. The encryption may be performed using format preserving encryption (FPE) to add an additional layer of security as shown at block 424. The system then checks to see if the resulting random token (e.g., random number) exists in the system memory random column list, in order to make sure the same random token has not been previously created. If the random token does exist, the process returns to block 420 where the system repeats the steps illustrated at blocks 420, 422 and 424 to form a new random token. If the random token does not exist, the process populates the random column list in the system memory for the random token table with the random token value as shown in block 428.

After the process of generating the random tokens is complete, the process may include encrypting the token tables. For example, the list of random numbers may be split into two or more groupings of tokens. Each grouping of tokens may utilize a different encryption method and/or key in order to provide additional security to the storage of the randomized token tables. That is, the encryption of the groups of tokens in the table may be different, such that one person and/or a compromise of one encryption key could not be used to access the entire table.

In one example, as illustrated in block 406, the groups of tokens may be split into Y number of records, and a JSON string may be utilized with the actual values and random values. Then, as illustrated in block 408, the system encrypts the JSON string, appends a key ID for the encryption, and computes a max, min an MD5 (Message Digest algorithm 5 (MD5)), and the encrypted value. As illustrated by block 410, the tokenization table 518 is populated with the min, max, MD5, and encrypted values.

The system then performs the same steps for the detokenization table 618. That is, as illustrated in block 412, the system sorts the random number list in system memory by random number value, splits the list for every Y number of records, and forms a JSON string containing the random value and the actual value of the data. Moreover, as illustrated in block 414, the system encrypts the JSON string and appends a key ID, and computes the MD5 of the encrypted value. Finally, the system uses the data created to populate the detokenization table 618 in block 416.

FIG. 5 illustrates a process flow for vaultless tokenization and encryption of data, in accordance with embodiments of the present invention. The process begins at block 502 by initiating the tokenization of the desired data. It should be understood that as previously discussed, the data may be any type of data. For example, the data may be test data, confidential data, social security numbers, resource pool numbers (e.g., account numbers, such as savings, checking, credit card, or other like resource pool numbers), names, addresses, client lists, e-mail addresses, transaction information (e.g., amounts, product code, order numbers), or any other types of data that a third-party and/or entity would like to store securely. This step may include identifying the data to be secured (e.g., tokenized, or the like), identifying an application associated with the data through which the data may be accessed, identifying the database where the data may be stored, or the like.

In some embodiments of the invention, block 504 of FIG. 5 illustrates that the first step of the process after identifying the data may be encrypting the data. In some embodiments, the initial encryption of the data is achieved using an FPE protocol. The FPE key may be protected by HSM 116 and may be unique for each token format. Moreover, the unique encryption key may be stored in the encryption database 114. As such, in some embodiments the tokenization module 102 may access the proper encryption key and format key information from the encryption database 114. Thereafter the original data may be transform into encrypted data using the encryption key and/or format key.

Next, the system 100 may split the encrypted data into segments containing "X" number of characters (e.g. 1, 2, 3, 4, or the like), as illustrated by block 506. For example, in some embodiments, if the encrypted data is a 9 digit number, it may be split into two or more parts (e.g., 5/4 digit segments, 4/3/2 digit segments, 3/3/3 digit segments, 6/3 digit segments, 2/2/2/3 digit segments, or the like). The encrypted data is split into the two or more encrypted data segments in order to provide an additional layer of security, as well as in order to utilize the random token tables for tokenization. Due to storage requirements for the random token tables, the length of characters for each segment may be required to be less than or equal to 6 characters. In some embodiments, the ideal number of characters in a split segment may be set to a specific number (e.g., 1, 2, 3, 4, 5, 6, 7, 8, 9, or any other number). For instance, the system may be configured to split the data in to segments containing an ideal number of 6 characters. For a numerical data string containing 14 digits, the system would split the data string into 3 data segments, the first containing 6 digits, the second containing 6 digits, and the third containing 2 digits. In some embodiments, the original numerical data may have a length equal to the ideal number of characters and would not require splitting. For instance, the original data may be only 6 digits in length and would not require splitting. By using a segment length of 6 digits, the system can achieve a threshold level of security wherein the odds of randomly guessing the mapped data portion for each 6 digit segment are one in a million.

Tokenization formats may be created through the administration interface 108 by the internal users 4 or may be determined by the third party users through the third party access systems 104. The formats are segmented as per the type and split length, which may be determined by the third party and/or the entity, or sub thereof, which is requesting the tokenization of the data. The segment types can be numeric, alphabetic, or alphanumeric. The split length includes the number of characters for which each segment needs to be parsed and replaced by the random tokens. In some embodiments, the split length cannot be less than three and more than six characters. In other embodiments, splitting of the original data may not occur unless the original data meets a threshold character length. It should be understood that if the data was not previously encrypted, the original data may be spilt into the one or more data segments instead of the encrypted.

In some embodiments, the original data may contain a check digit. In this instance, the system tokenizes the data using "n–1" digits, wherein the last digit is removed prior to tokenization to ensure that the tokenized sequence does not satisfy the Luhn checksum algorithm. The check digit may be appended back into the tokenized sequence at the conclusion of the tokenization process, or otherwise stored in the tokenization database, or in some embodiments a new check digit may be created for the tokenized sequence. In some instances, metadata associated with the tokenized sequence may indicate the check digit itself, indicate the presence of a check digit in the original data, or instruct the system to create a new check digit and/or remove the re-appended check digit prior to the detokenization process.

After the encrypted data has been split according to the token format and length, the system 100 may check the system cache to determine if the random token tables or portions thereof for the split segments are present in the cache, as illustrated in block 508 of FIG. 5 (e.g., the token table was previously accessed and stored). Alternatively, the system may retrieve the random token tables (or the tokens stored therein) from the tokenization database 112, as shown in block 510 of FIG. 5. It should be understood that regardless of how the random tokens are access (e.g., through the store cache and/or through the tokenization database 112), access to the random tokens in the token table may be based on the authentication service, which authenticates the user 4 and/or the system being used) before allowing the user 4 and/or the system to access the random tokens. Moreover, it should be further understood that the tokens within the random token tables may be encrypted, and as such, the user 4 and/or system associated therewith, may be authenticated before accessing and/or decrypting at least a portion of the token tables.

After the random tokens are identified, the random tokens are combined into a tokenized sequence as shown in block 512 of FIG. 5. Like the split previously described with respect to block 506 the tokenized segments may be assembled into a tokenized sequence through the use of a formatted combination that indicates the order in which the tokenized segments were combined into the tokenized sequence. In some embodiments, the formatted combination order may be coupled to the tokenized sequence, such as through the use of the metadata or other technology.

Next, at illustrated in block 514 in FIG. 5, the system encrypts the tokenized sequence to produce an encrypted tokenized sequence. Like the potential encryption discussed with respect to block 504 of FIG. 5, in some embodiments, this encryption of the tokenized sequence is achieved using an FPE protocol. The encrypted tokenized sequence is returned as output from the tokenization module 102 at block 516.

It should be understood, that the encrypted token sequence may be stored for future use, distributed as a token for use (e.g., for use by a third-party or a line of business within the entity). In one example, the token may be used for interactions using a resource pool of the user. That is the token may be used as a substitute for an actual resource pool number. As such, the interaction may occur using the token, but when the entity receives the notification of the interaction and the use of the token, the entity may utilize a detokenization process in order to proceed with the interaction (e.g., assign the interaction to the actual resource pool number).

FIG. 6 illustrates a process flow for vaultless detokenization of the encrypted tokenized sequence, in accordance with embodiments of the present invention. The process begins at block 602 by initiating the detokenization of the encrypted tokenized sequence. For example, the detokenization process may begin when an internal request or third-party request is made to access data that has been tokenized. Alternatively, the process may begin when an encrypted tokenized sequence is received as part of an interaction in which the third-party and/or the entity is involved (e.g., or a user thereof).

The first step of the process, as illustrated at block 604, indicates that the encrypted tokenized sequence is decrypted by applying the associated encryption key. In some embodiments the associated encryption key is stored in the encryption database 114. The encrypted tokenized sequence may have encryption information attached thereto, such as metadata, which indicates the encryption key and/or location of the encryption key that is utilized to decrypt the encrypted tokenized sequence. After decryption, a tokenized sequence remains.

Next, as illustrated block 606, the system splits the tokenized data into two or more tokenized segments each containing one or more characters (e.g. 1, 2, 3, 4, 5, 6 or the like characters in the segment) as illustrated by block 606. In some embodiments, the system may use token format metadata in the tokenized sequence to determine how the random tokens were previously split in order to correctly split the tokenized sequence into the random tokenized segments. In other embodiments, the system may not have split the original data when forming the tokenized data. In this case, the system would not split the tokenized data, and would proceed to step 608 or 610 to retrieve the encrypted data from the detokenization table 618.

In some embodiments, the original data may contain a check digit. In this instance, the system tokenizes the data using "n−1" digits, wherein the last digit is removed prior to tokenization to ensure that the tokenized sequence does not satisfy the Luhn checksum algorithm. The check digit may be appended back to the tokenized sequence at the conclusion of the tokenization process or otherwise stored in the tokenization database, or in other embodiments a new check digit may be created based on the tokenized database. In some instances, metadata associated with the tokenized sequence may indicate the check digit itself, indicate the presence of a check digit in the original data, or instruct the system to create a new check digit and/or remove the re-appended check digit prior to the detokenization process.

After splitting the tokenized sequence into the two or more tokenized segments, the system then determines the two or more encrypted data segments from the random token tables. For example, in one embodiment, the system accesses a cache to determine if the two or more token segments are present in the system cache, as illustrated in block 608. Alternatively, as illustrated in block 610 of FIG. 6, the system accesses the one or more random token tables (e.g., the same tables used for tokenization, or alternate detokenization tables specific to detokenization), which may be stored in the tokenization database 112. As such, the random token segments are located in the one or more token tables and the associated two or more encrypted data segments are retrieved. As previously discussed the one or more token tables may be encrypted themselves, and as such, the user, application, and/or system may require authentication before accessing the one or more token tables.

Block 612 of FIG. 6 further illustrates that after the two or more encrypted data segments are retrieved from the random tokenization tables (e.g., the detokenization tables) the two or more encrypted data segments are combined into an encrypted data sequence in the same manner as they were previously split (e.g., as discussed with respect to block 506 in FIG. 5). As previously described herein, the split order of the two or more encrypted data segments may be stored as metadata that is associated with the decrypted tokenized sequence.

Next, at block 614 of FIG. 6, the system may decrypt the encrypted data sequence to produce the original data. As previously discussed with respect to block 604 the encryption key may be stored in the encryption database 114. Moreover, metadata associated with the encrypted data sequence may indicate what encryption key to utilize from the encryption database 114 to decrypt the encrypted data sequence into the original data.

The fully detokenized data is returned as output as illustrated by block 616. The data may be used internally by an internal user 4 and/or by a third party user 4 for any type of interaction depending on the type of data and the uses of such data.

It should be understood that applications that are enabled for tokenization (e.g., allowed to tokenize data) should be given permissions to all of the tokenization formats in order to allow the application to tokenize in any available way (e.g., any format and/or character length). However, for a given tokenization format, an application may be given full detokenization rights, or otherwise the application detokenization rights can be restricted in order to limit access to the detokenized data. Applications can also be given full access or can be restricted to just view masked detokenized data.

Various embodiments of the present invention related to tokenizing different types of data for different purposes. Tokenization is generally described in the area of interactions (e.g., transactions, or the like) as utilizing a "token" (e.g., an alias, substitute, surrogate, or other like identifier) as a replacement for sensitive information. As such, tokens or portions of tokens may be used as a stand in for a user account number, user name, social security number, physical address, password, pin number, routing information related to a financial account, security code, or other like information. Furthermore, sensitive information in the form of numerical digits, alphanumeric character, symbols, ASCII characters, are all contemplated by the system and may be tokenized. Once tokenized, the one or more tokens may be stored and transmitted securely for various reasons such as authentication, payment transfer, or information storage.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to tokenization and/or detokenization requests. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like). It should be understood that the systems and devices described herein illustrate some embodiments of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A data security system utilizing vaultless tokenization and encryption, the system comprising:
   one or more memory components having computer readable code store thereon; and
   one or more processing components operatively coupled to the one or more memory components, wherein the one or more processing components are configured to execute the computer readable code to:
      identify data for secure storage;
      encrypt the data into encrypted data, wherein encrypting the data further comprises encrypting the data using format preserving encryption;
      split the encrypted data into two or more encrypted data segments when the data meets a threshold number of characters;
      access one or more random token tables containing random tokens;
      retrieve two or more random token segments that are mapped to the two or more encrypted data segments from the one or more random token tables;
      combine the two or more random token segments into a tokenized sequence; and
      return the tokenized sequence.

2. The system of claim 1, wherein the one or more processing components are further configured to execute the computer readable code to:
   encrypt the tokenized sequence to create an encrypted tokenized sequence; and
      wherein encrypting the tokenized sequence comprises encrypting the tokenized sequence using format preserving encryption.

3. The system of claim 2, wherein the one or more processing components are further configured to execute the computer readable code to:
   receive a request from a user to access the data;
   authenticate the user for access to the data;
   identify access permission of the user;
   provide the encrypted tokenized sequence as input for detokenization;
   decrypt the encrypted tokenized sequence to determine the tokenized sequence;
   split the tokenized sequence into the two or more random token segments;
   access the one or more random token tables;
   retrieve the two or more encrypted data segments from the one or more random token tables for each of the two or more random token segments;
   combine the two or more encrypted data segments into the encrypted data;
   decrypt the encrypted data into the data; and
   provide the data to the user in full or in partial form based on the access permission of the user.

4. The system of claim 1, wherein the one or more random token tables are encrypted and stored as encrypted one or more random tables, and wherein accessing the one or more random tables comprises:
   decrypting the encrypted one or more random token tables;
   storing the one or more random token tables temporarily in the one or more memory components; and
   removing the one or more random tables from temporary storage after retrieving the two or more random token segments.

5. The system of claim 1, wherein the random tokens of the one or more random token tables have lengths of one to six characters.

6. The system of claim 1, wherein the one or more processing components are further configured to execute the computer readable code to:
   determine when the encrypted data does not meet the threshold number of characters;
   access the one or more random token tables containing the random tokens;
   retrieve a single random token that is mapped to the encrypted data from the one or more random token tables, wherein the random token segment that is mapped to the encrypted data represents the tokenized sequence; and
   return the tokenized sequence based on the single random token.

7. The system of claim 1, wherein the two or more encrypted data segments each comprise three to six characters.

8. The system of claim 1, wherein returning the tokenized sequence comprises storing the tokenized sequence for future use.

9. A computer implemented method for vaultless tokenization and encryption of data, the method comprising:
   identifying, by one or more processor components, data for secure storage;
   encrypting the data into encrypted data, wherein encrypting the data further comprises encrypting the data using format preserving encryption;
   splitting, by the one or more processor components, the encrypted data into two or more encrypted data segments;
   accessing, by the one or more processor components, one or more random token tables containing random tokens;
   retrieving, by the one or more processing components, two or more random token segments that are mapped to the two or more encrypted data segments from the one or more random token tables;
   combining, by the one or more processing components, the two or more random token segments into a tokenized sequence; and
   returning, by the one or more processing components, the tokenized sequence.

10. The computer implemented method of claim 9, the method further comprising encrypting the tokenized sequence to create an encrypted tokenized sequence; and wherein encrypting the tokenized sequence comprises encrypting the tokenized sequence using format preserving encryption.

11. The computer implemented method of claim 10, further comprising:
receiving, by the one or more processing components, a request from a user to access the data;
authenticating, by the one or more processing components, the user for access to the data;
identifying, by the one or more processing components, access permission of the user;
providing, by the one or more processing components, the encrypted tokenized sequence as input for detokenization;
decrypting, by the one or more processing components, the encrypted tokenized sequence to determine the tokenized sequence;
splitting, by the one or more processing components, the tokenized sequence into the two or more random token segments;
accessing, by the one or more processing components, the one or more random token tables;
retrieving, by the one or more processing components, the two or more encrypted data segments from the one or more random token tables for each of the two or more random token segments;
combine, by the one or more processing components, the two or more encrypted data segments into the encrypted data;
decrypting, by the one or more processing components, the encrypted data into the data; and
providing, by the one or more processing components, the data to the user in full or in partial form based on the access permission of the user.

12. The computer implemented method of claim 9, wherein the one or more random token tables are encrypted and stored as encrypted one or more random tables, and wherein accessing the one or more random tables comprises:
decrypting the encrypted one or more random token tables;
storing the one or more random token tables temporarily; and
removing the one or more random tables from temporary storage after retrieving the two or more random token segments.

13. The computer implemented method of claim 9, wherein the random tokens of the one or more random token tables have lengths of one to six characters.

14. The computer implemented method of claim 9, wherein the two or more encrypted data segments each comprise three to six characters.

15. The computer implemented method of claim 9, wherein returning the tokenized sequence comprises storing the tokenized sequence for future use.

16. A computer program product for vaultless tokenization and encryption of data, the computer program product comprising at least one non-transitory computer-readable medium having computer-readable program code portions embodied therein, the computer-readable program code portions comprising:
an executable portion configured to identify data for secure storage;
an executable portion configured to encrypt the data into encrypted data, wherein encrypting the data further comprises encrypting the data using format preserving encryption;
an executable portion configured to split the encrypted data into two or more encrypted data segments;
an executable portion configured to access one or more random token tables containing random tokens;
an executable portion configured to retrieve two or more random token segments that are mapped to the two or more encrypted data segments from the one or more random token tables;
an executable portion configured to combine the two or more random token segments into a tokenized sequence; and
an executable portion configured to return the tokenized sequence.

17. The computer program product of claim 16, wherein the computer-readable program code portions further comprise:
an executable portion configured to encrypt the tokenized sequence to create an encrypted tokenized sequence; and
wherein encrypting the tokenized sequence comprises encrypting the tokenized sequence using format preserving encryption.

18. The computer program product of claim 16, wherein the one or more random token tables are encrypted and stored as encrypted one or more random tables, and wherein the executable portion configured to access the one or more random tables comprises:
an executable portion configured to decrypt the encrypted one or more random token tables;
an executable portion configured to store the one or more random token tables temporarily; and
an executable portion configured to remove the one or more random tables from temporary storage after retrieving the two or more random token segments.

19. The computer program product of claim 16, wherein the random tokens of the one or more random token tables have lengths of one to six characters.

20. The computer program product of claim 16, wherein the two or more encrypted data segments each comprise three to six characters.

* * * * *